United States Patent [19]

Arsenault

[11] Patent Number: 5,118,716
[45] Date of Patent: Jun. 2, 1992

[54] ION EXCHANGE RESINS HAVING CARBODITHIOATE GROUPS

[75] Inventor: Gilles J. Arsenault, Courtright, Canada

[73] Assignee: Polysar Rubber Corporation, Sarnia, Canada

[21] Appl. No.: 593,008

[22] Filed: Oct. 5, 1990

Related U.S. Application Data

[63] Continuation-in-part of Ser. No. 438,038, Nov. 20, 1989, abandoned.

[51] Int. Cl.⁵ ................................. C08F 5/20
[52] U.S. Cl. ........................ 521/33; 521/30
[58] Field of Search ............... 424/79; 521/33

[56] References Cited

U.S. PATENT DOCUMENTS

| | | | |
|---|---|---|---|
| 2,564,795 | 8/1951 | Sibley | 525/350 |
| 2,992,210 | 7/1961 | Gluckman | 525/350 |
| 3,347,834 | 10/1967 | Naylor | 525/350 |
| 3,586,644 | 6/1971 | de Jong | 525/350 |
| 4,354,007 | 10/1982 | Scott | 525/350 |
| 4,464,515 | 8/1984 | Rempel et al. | 525/350 |
| 4,575,541 | 3/1986 | Carpino | 525/350 |
| 4,670,160 | 6/1987 | Moriya et al. | 525/350 |
| 4,731,187 | 3/1988 | Moriya | 210/719 |

Primary Examiner—Thurman K. Page
Assistant Examiner—Peter F. Kulkosky
Attorney, Agent, or Firm—Stevens, Davis, Miller & Mosher

[57] ABSTRACT

This invention provides a new ion exchange resin which is characterized by having carbodithioate functionality (e.i. $\text{P}-CS_2^-M^+$ where $\text{P}$ represents the resin bead and where M is selected from Na, K and Li).

The present ion exchange resin may be prepared from a suitable non-functionalized resin bead by subjecting it to bromination, lithiation and treatment with carbon disulfide. Alternatively, a styrene-divinylbenzene resin which contains from 10 to 50 weight % DVB may be functionalized by lithiation and treatment with $CS_2$.

The carbodithioate functionalized resin of this invention is resistant to hydrolysis and is effective for the removal of Group VIII precious metals (e.g. rhodium) from chemical process streams.

5 Claims, No Drawings

ION EXCHANGE RESINS HAVING CARBODITHIOATE GROUPS

This application is a continuation-in-part of Ser. No. 07/438,038, filed Nov. 20, 1989 and now abandoned.

FIELD OF THE INVENTION

This invention provides a novel ion exchange resin which is characterized by having carbodithioate functionality. The present ion exchange resin is surprisingly efficient when used to remove precious metals from chemical process streams.

BACKGROUND OF THE INVENTION

Ion exchange is a well known, commercially practiced process and is widely reported in the open literature. A review of ion exchange technology is given in "Kirk-Othmer Cyclopedia of Chemical Technology" (3rd ed., Vol. 13, p. 678-705, by R. M. Wheaton and L. J. Lefevre, published by Wiley and Sons). As disclosed in the aforesaid Kirk-Othmer reference, conventional ion exchange resins normally have sulfonic acid functionality, but it is known to prepare ion exchange resins having other types of functional groups. For example, ion exchange resins having functional groups which chelate metals (e.g. thiols, amines) are used in the hydro-metallurgical industry. It is also known to prepare carbamate functionalized resins by reacting an amine functionalized resin with carbon disulfide (see Chemical Abstracts, vol. 102: 46764e U.S. Pat. No. 4,670,160 and U.S. Pat. No. 4,731,187). However, as will be apparent to those skilled in the art, the carbon-nitrogen bond reduces the stability of this functional group.

Heretobefore, there has not existed an ion exchange resin having carbodithioate functionality.

SUMMARY OF THE INVENTION

The present invention generally relates to an ion exchange resin which contains carbodithioate functionality and which does not contain a carbon-nitrogen bond. The functional group of the present resin is surprisingly stable, and is comparatively resistant to hydrolysis and/or oxidation. Thus, the present invention provides:

A carbodithioate-functionalized ion exchange resin represented by the formula:

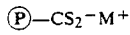—$CS_2^- M^+$ wherein said 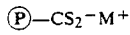— is a styrene-divinylbenzene resin having from 2 to 50 weight % bound divinylbenzene units and wherein said M is selected from Na, K and Li.

DETAILED DESCRIPTION

As used herein, the term "ion exchange resin" is meant to refer to its conventional meaning, namely a crosslinked polymer resin bead which typically has a particle size between 0.1 and 2.5 mm (dry basis), a bulk density of between 600 and 800 grams/liter (wet basis) and a functional group which makes it suitable for use in an ion exchange process. The ion exchange resin of the present invention is prepared by using a "non-functionalized resin" (i.e. a resin which does not contain ionic functionality) as the starting material, and treating it to provide carbodithioate functionality. Specifically, a divinylbenzene-crosslinked-styrene copolymer resin ("S-DVB") is the starting material. Typical examples of suitable S-DVB resins contain from 2 to 50 weight percent, especially from 15 to 30 weight percent, of bound divinylbenzene (with the balance consisting of bound styrene) and are crosslinked to the extent that they are insoluble in organic solvents. Such S-DVB resins are well known articles of commerce which may be conveniently prepared by a conventional free radical polymerization process, as described by Kun and Kunin (Kun and Kunin, Journal of Polymer Science: Part A-1, Volume 6, pages 2689-2701, (1968)). Most preferably, the starting materials is an S-DVB resins which is "macroreticular" (also referred to as "macroporous"). Macroreticular ion exchange resins have large pore volumes which are normally described as being greater than 0.7 ml/grams. Highly preferred macroreticular resins are further characterized by having a porosity of greater than 45 percent (as measured by mercury porisimetry) and a BET surface area of 100 $m^2$/gram or higher.

The ion exchange resin of this invention must contain carbodithioate functionality (i.e 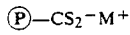—$CS_2^- M^+$, where 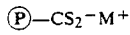— is the ion exchange resin used a starting material and M is selected from Li, Na and K. The term "carbodithioate functionality" is meant to clearly exclude carbazido functionality (i.e. the resin of the present invention must not contain carbon-nitrogen bonds in the functional group). Ion exchange resins having from 0.4 to 1.0 milliequivalents (meq) of $CS_2$/gram of resin (dry basis) are especially preferred. Resins having a lower level of functionality may be used, but have a correspondingly lower level of absorption capacity. Resins having a higher level of functionality are difficult to prepare in an economically viable manner. A method for the preparation of a carbodithioate functionalized resin is generally described below.

This method requires bromination and subsequent lithiation of a non-functionalized resin, followed by treatment with carbon disulfide.

The ion exchange resin starting material is initially brominated by contacting it with a bromine-containing solution.

The brominated ion exchange resin is then lithiated by treatment with an organo-lithium reagent. Conventional organo-lithium reagents, such as short chain lithium alkyls (especially n-butyl lithium or sec-butyl lithium) are suitable for this purpose.

The so-lithiated resin is then contacted with carbon disulfide to produce a final, carbodithioate functionalized ion exchange resin according to the present invention.

A more convenient method for preparing the ion exchange resins of the present invention employs a S-DVB resin having from 10 to 50 weight % bound DVB, and pendant vinyl groups. As described in the aforesaid Kun and Kunin reference, S-DVB resins having pendant vinyl groups may be produced by controlling the amount of DVB present in the polymerization and by controlling the extent of polymerization. In particular, S-DVB resins having more than 10% DVB are described as being sufficiently "rigid" to "freeze in" some pendant vinyl groups.

A S-DVB resin having pendant vinyl groups may be lithiated without prior bromination.

Thus, an ion exchange resin according to the present invention may be prepared by the process consisting of:
i) providing a styrene-divinylbenzene copolymer resin having from 10 to 50 weight % bound divinylbenzene units and having pendant vinyl groups;

ii) preparing a lithiated resin by lithiating said copolymer resin with an alkyl-lithium reagent, and iii) treating said lithiated resin with carbon disulfide.

Further details regarding procedures to prepare the present ion exchange resins are provided by the accompanying examples.

While not wishing to limit the invention, the present ion exchange resin is suitable for the recovery of Group VIII metals and is surprisingly effective for the removal of rhodium containing catalysts (such as $RhCl(PPh_3)_3$ and $HRh(PPh_3)_4$) from chemical process streams. Furthermore, the present resin may be suitable employed in the process for the removal of other heavy metal ions (such as Ag, Cd, Hg, V or Cu) from organic or aqueous streams.

EXAMPLE 1

This example illustrates the preparation of an ion exchange resin having carbodithioate functionality.

The starting material was a non-functionalized, S-DVB resin sold under the tradename BioBeads SM16 by Bio-Rad Laboratories. This resin was a "processed" grade (i.e. it was washed and screened by the supplier). The resin was reported to be macroreticular and to have a surface area of greater than 800 $m^2$/gram. A carbodithioate functionalized resin according to the present invention was prepared from this macroreticular resin by bromination, lithiation and treatment with carbon disulfide, as described below.

The initial bromination reaction was completed in a three necked, 1 liter flask equipped with a reflux condenser, mechanical stirrer and dropping funnel. 20 grams of the above macroreticular resin were added to the flask, together with 300 ml of methylene chloride and 0.5 grams of ferric chloride. The mixture was stirred in darkness for 30 minutes, followed by the dropwise addition of 30.3 grams of bromine (diluted in 55 ml of methylene chloride).

After stirring for a further hour in darkness, the mixture was heated to reflux for 4.5 hours and then stirred at room temperature overnight. The reaction mixture still had a red colour due to excess free bromine. Aqueous sodium bisulfite (5%, 100 ml) was carefully added to the solution with stirring. The resin was collected by filtration, washed with methylene chloride, acetone, acetone-water (2:1), acetone, benzene and methanol, and then washed in a Soxhlet extractor overnight using methylene chloride as a solvent. After drying under vacuum at 60° C., 28.6 grams of pale beige resin was obtained.

Analysis of the brominated resin showed it to contain 30.5 weight percent bromine.

Lithiation of the brominated resin was then completed as follows: A mixture of 8.0 grams of the above brominated resin and 100 ml of dry THF was put in a 500 ml three-necked flask fitted with a mechanical stirrer, a condenser and a rubber septum. The system was purged with nitrogen and maintained under nitrogen throughout the reaction. The mixture was cooled to 0° C. and n-Butyl lithium in hexane (2.5M in hexane, 30 ml) was added dropwise via a syringe. The reaction mixture was stirred at 0° C. for 30 minutes and then at room temperature for 1 hour. This lithiated resin was used for the next step without isolation.

A solution of cuprous bromide and lithium bromide in THF was added to the above lithiated resin while keeping the mixture at a temperature of 0° C. Carbon disulfide was then added to the mixture to provide carbodithioate functionality (of the form $\text{\textcircled{P}}-CS_2^-Li^+$ in view of the intermediate lithiation step).

EXAMPLE 2

This example illustrates the use of the carbodithioate functionalized resin described in Example 1 to remove rhodium from a viscous, rhodium-containing rubber solution.

The rubber solution was prepared by the homogeneous hydrogenation of a chlorobenzene solution of acrylonitrile-butadiene rubber, using $HRh(PPh_3)_4$ catalyst and triphenylphosphine cocatalyst. Further details regarding this type of hydrogenation process are provided in U.S. Pat. No. 4,464,515. The solution was then diluted with a minor amount of chlorobenzene to provide a 6 percent solution (i.e. weight hydrogenated rubber/weight solvent basis).

The capability of the carbodithioate resin of Example 1 to remove rhodium from the above rubber solution was then tested in the inventive experiment described below.

150 ml of the rubber solution was added to a stirred, 500 ml three necked flask, together with 0.5 grams of the resin described in Example 1. This reaction mixture was stirred and refluxed under nitrogen for 5 hours. The resin was then removed from the mixture by filtration. The rubber was then recovered by evaporation of the solvent in a rotary evaporator, followed by drying in a reduced pressure oven at 60° C. A sample of the recovered rubber was analyzed for Rh content by atomic absorption spectroscopy and found to contain 9.2 ppm Rh.

In a comparative experiment, the rubber from an untreated, 150 ml sample of the rubber solution was recovered by the evaporation/drying procedures described above. The rubber from the control experiment was analyzed by atomic absorption spectroscopy and found to contain 104 ppm.

Thus, a comparison between the results of the inventive and comparative experiments indicates that 91 percent of the available rhodium was removed by the inventive resin.

EXAMPLE 3

The procedures described in Example 2 for the preparation of the inventive carbodithioate functionalized resin were repeated to prepare a "duplicate" ion exchange resin.

The duplicate ion exchange resin was then used to treat another 150 ml sample of the rhodium-containing rubber solution, also as described in Example 2.

The rhodium content of the rubber recovered from the experiment of this Example was determined to be 5.8 ppm, indicating that 94 percent of the rhodium was removed by the inventive resin.

EXAMPLE 4

The procedures described in Example 2 for the preparation of the inventive carbodithioate functionalized resin were repeated, except that the starting material was an "unprocessed" grade of resin (i.e. the starting material was a macroreticular, S-DVB resin obtained from Bio-Rad Laboratories, but it was not pre-washed and screened by the supplier prior to shipment).

Elemental analysis was completed on the final carbodithioate functionalized resin. The functionalized resin was found to contain 3.1 weight percent sulfur, from which it can be calculated that the resin had a degree of functionalization of 0.48 milliequivalents of $CS_2$ per gram of dry resin.

A rhodium-containing, hydrogenated acrylonitrile-butadiene rubber solution was prepared according to the hydrogenation process described in Example 2. Analysis of rubber recovered from this solution showed it to contain 60.9 ppm of rhodium.

The inventive ion exchange resin of this Example was then used to treat a 150 ml sample of this rubber solution, using the procedures described in Example 2.

The rhodium content of the rubber recovered from the experiment of this Example was 7.9 ppm, indicating that 87 percent of the rhodium was removed.

EXAMPLE 5

This example illustrates a very convenient process for the preparation of an ion exchange resin according to the present invention.

In the first experiment of this example, S-DVB resin beads obtained from the Dandong #3 Chemical Plant (Dandong, China) were used as the starting material. A literature method was used for the infrared analysis of the beads (reference: M. Bartholin, Makromol. Chem. 182, 2075-2085 (1981)). This analysis showed the beads to contain 35 weight % bound DVB.

4 grams of the S-DVB resin beads were stirred with 50 ml of dry tetrahydrafuran (THF) under a nitrogen purge at 0° C. 15 ml of a 2.5M solution of n-butyl lithium in hexane was added dropwise to the reaction mixture. The reaction mixture was stirred at 0° C. for 30 minutes, followed by mixing at room temperature for one hour.

Carbon disulfide was subsequently added to the mixture (as described in Example 1) so as to provide carbodithioate functionality (which may be described by the formula 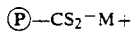—$CS_2^-Li^+$).

Analysis of the functionalized resin showed it to contain 1.61% sulfur (or approximately 0.25 meq. of carbodithioate functionality per gram of resin).

Another experiment was subsequently completed using a slight modification of the above described procedures.

S-DVB resin beads were initially prepared by the conventional free radical polymerization of a monomer mixture containing 70 weight % styrene and 30 weight # divinylbenzene. 5 grams of these S-DVB resin beads were added to a 500 ml flask, together with 150 ml of dry hexane.

5 ml of tetramethylethylenediamine ("TMEDA") was then added to the mixture, followed by 10 ml of a 2.5M solution of n-butyl lithium in hexane. The mixture was heated to 50° C., stirred for five hours, then cooled to the ambient.

5 grams of $CS_2$ was then added to the flask and stirring was continued overnight.

Elemental analysis of the recovered functionalized resin beads showed them to contain 4.29 weight % sulfur (or approximately 0.67 meq of carbodithioate functionality per gram of resin). The elemental analysis also showed the functionalized resin beads to contain less than 0.2 weight % nitrogen (thus clearly indicating that the TMEDA was essentially not incorporated into the resin).

In summary, this example illustrates a convenient process to prepare a carbodithioate functionalized resin. The present process utilizes conventionally-prepared S-DVB resin beads as a starting material, and does not require a bromination step to activate the base resin.

What is claimed is:

1. A carbodithioate-functionalized ion exchange resin having from 0.4 to 1.0 milliequivalents of carbodithioate functionality per gram of dry resin and represented by the formula:

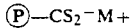—$CS_2^-M+$ wherein said 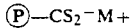— is a styrene-divinylbenzene copolymer resin having from 10 to 50 weight % bound divinylbenzene units and wherein said M is Li, prepared from a starting material consisting of a non-functionalized macroreticular resin having an average particle size of from 0.1 to 2.5 mm, on a dry basis, and a porosity of greater than 45 percent which has been subjected to bromination, subsequent lithiation and final treatment with carbon disulfide.

2. The ion exchange resin of claim 1 wherein said non-functionalized, macroreticular ion-exchange resin is a styrene-divinylbenzene copolymer which contains from 15 to 30 weight percent bound divinylbenzene.

3. The ion exchange resin of claim 1 wherein said lithiation consists of treatment with n-butyl lithium.

4. The ion exchange resin of claim 1, wherein said alkyl lithium reagent is n-butyl lithium.

5. A carbodithoate-functionalized ion exchange resin having from 0.4 to 1.0 milliequivalents of carbodithioate functionality per gram of dry resin and represented by the formula:

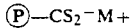—$CS_2^-M+$ wherein said 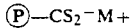— is a styrene-divinylbenzene copolymer resin having from 10 to 50 weight % bound divinylbenzene units and wherein said M is Li, prepared from a starting material consisting of a non-functionalized macroreticular resin having an average particle size of from 1.0 to 2.5 mm, on a dry basis, a porosity of greater than 45 percent and having pendant vinyl groups which has been subjected to lithiation by treatment with an alkyltilithium reagent and then treatment with carbon disulfide.

* * * * *